(12) United States Patent
Chiu et al.

(10) Patent No.: US 8,579,663 B2
(45) Date of Patent: Nov. 12, 2013

(54) DIGITAL CARD ADAPTER

(75) Inventors: Wen-Ta Chiu, New Taipei (TW); Wen-Shuan Shih, New Taipei (TW)

(73) Assignee: Chant Sincere Co., Ltd., New Taipei (TW)

( * ) Notice: Subject to any disclaimer, the term of this patent is extended or adjusted under 35 U.S.C. 154(b) by 52 days.

(21) Appl. No.: 13/315,584

(22) Filed: Dec. 9, 2011

(65) Prior Publication Data

US 2013/0149903 A1   Jun. 13, 2013

(51) Int. Cl.
*H01R 13/66* (2006.01)

(52) U.S. Cl.
USPC ..................................... 439/620.21

(58) Field of Classification Search
USPC ............ 439/620.21, 631, 159, 638, 945, 760
See application file for complete search history.

(56) References Cited

U.S. PATENT DOCUMENTS

| | | | |
|---|---|---|---|
| 7,052,295 B1 * | 5/2006 | Lin | 439/159 |
| 7,097,512 B1 * | 8/2006 | Hsiao et al. | 439/630 |
| 7,172,464 B1 * | 2/2007 | Lee | 439/630 |
| 7,326,086 B1 * | 2/2008 | Lee et al. | 439/630 |
| 7,485,005 B1 * | 2/2009 | Chi | 439/630 |
| 2006/0166559 A1 * | 7/2006 | Nakai et al. | 439/630 |

* cited by examiner

*Primary Examiner* — Jean F Duverne
(74) *Attorney, Agent, or Firm* — Bacon & Thomas, PLLC

(57) ABSTRACT

A digital card adapter comprises a cover configured to a large-size appearance in shape of the SD card, a printed circuit board disposed at the cover, a set of terminals disposed in the center of the cover, and an insulative housing. The adapter provides a print circuit board being mounted inside a card-shape cover, and accomplishes to transfer data there between two different sizes cards in accordance with standard of SD 4.0 specification, meanwhile, achieves adapting two SD 4.0 card in different sizes.

11 Claims, 6 Drawing Sheets

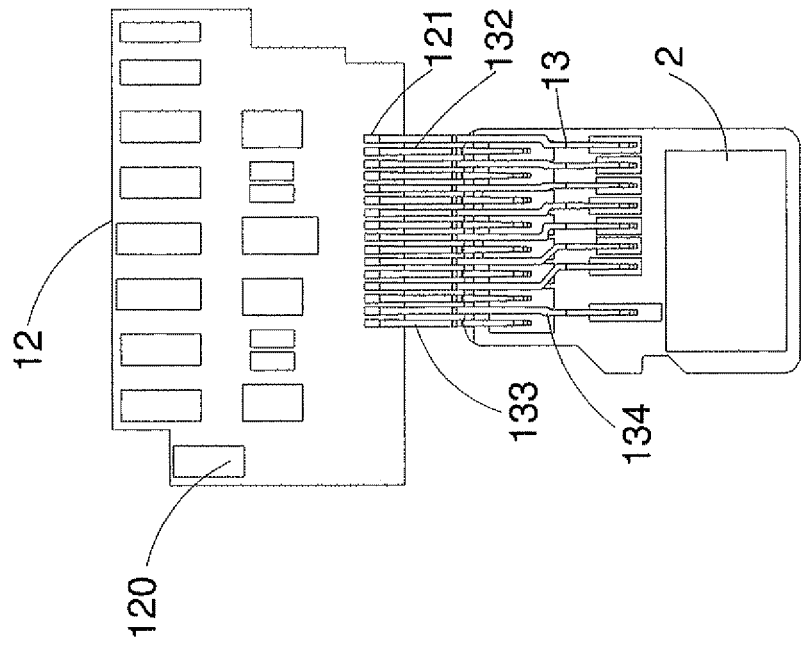
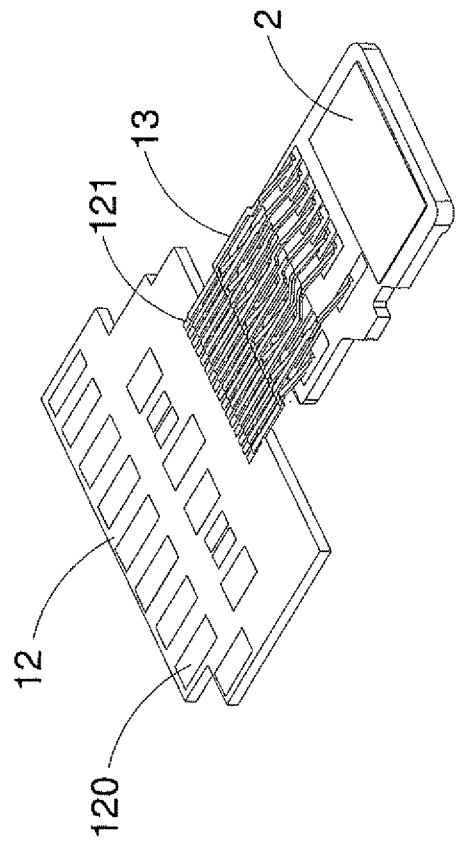
FIG.4B
FIG.4A

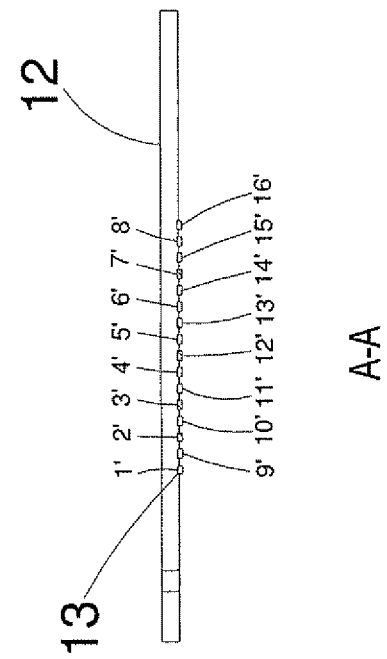
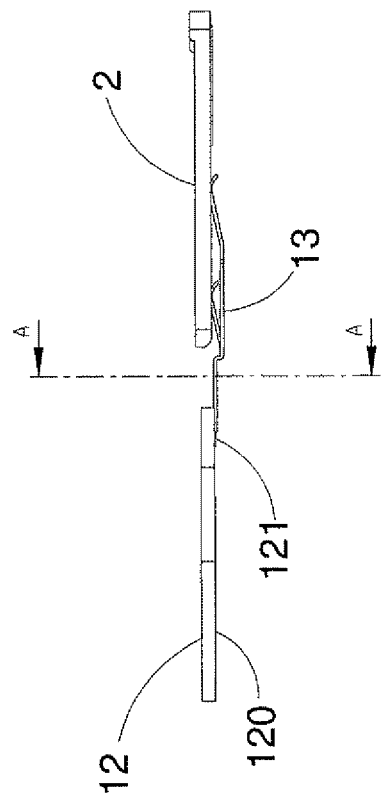

| Pin | Name | SPEC | Pin | Name | SPEC |
|---|---|---|---|---|---|
| 1' | - | | 9' | $V_{DD2}$ | PWR |
| 2' | - | | 10' | $V_{SS}^1$ | GND |
| 3' | - | | 11' | D0+ | |
| 4' | $V_{DD1}$ | PWR | 12' | D0- | |
| 5' | - | | 13' | $V_{SS}^1$ | GND |
| 6' | $V_{SS}^1$ | GND | 14' | D1- | |
| 7' | RCLK+ | | 15' | D1+ | |
| 8' | RCLK- | | 16' | $V_{SS}^1$ | GND |

DIGITAL CARD ADAPTER

BACKGROUND OF THE INVENTION

1. Field of the Invention

The present invention relates generally to a digital card adapter, and more specifically, to a digital card adapter in which a print circuit board being mounted inside a card-shape cover, wherein transferring data there between two different size cards in accordance with standard of SD 4.0 specification.

2. Description of the Related Art

SD Memory Card (Secure Digital Memory Card) has been as a standard and popular memory card. It is widely used in portable electronic devices such as digital cameras, personal digital assistant (PDA) and multimedia players.

SD card technology is based on the MultiMedia Card (MMC) format, and constantly updated its standard. Precisely, the MMC cards were having heavy thickness to the SD card, and performed much lower transfer speed to the SD cards. SD Card is not the only approved standard in Secure Digital Card Alliance, otherwise, some similar cards circulated, such as, Mini SD, Micro SD and SDHC card.

Historically, the adapter for transferring data from Micro SD card to a SD card comprised a top cover, bottom cover, and a plurality of electrical conductive units. The slots were configured at one side of the bottom cover, wherein a plurality of electrical conductive units was installed. Then, the bottom cover was combined with the top cover.

However, such practice is only reasonable when the number of electrical conductive units was less than 10-pin. Once the number of electrical conductive units was 17-pin or more, the situation is kind of different. As the scale and the feature of SD card remains the same, the electrical conductive units inside the cover share limited space ultimately. Unwanted damages and unnecessary deformation are expecting to bring about, either in complex production process or under poor material expense.

SUMMARY OF THE INVENTION

Therefore, the present invention is directed to an improved adapter in which a print circuit board being mounted inside a card-shape cover, wherein transferring data there between two different sizes cards in accordance with standard of SD 4.0 specification after continuous efforts and trials of inventors.

The digital card adapter, comprises a top cover, a bottom cover and an opening, and defines a slot for receiving a digital card. The top cover and bottom cover were configured to a large-size appearance in shape of the SD card specification, wherein a small-size card inserting there through the opening.

A printed circuit board disposed at the front end of the bottom cover, includes: a plurality of contacts, a plurality of pads, a set of terminals and an insulative housing. The contacts, which conformed to the SD card specifications, were configured to one end of the circuit board. The pads, which electrically connected to the contacts, were configured to another end of the circuit board.

The set of terminals disposed in the center of the bottom cover contains a plurality of first arms and a plurality of second arms. The front ends of the first arms and the second arms were arranging in one line for each, and electrically connected to the pads of the circuit board. The insulative housing includes a plurality of first grooves and a plurality of second grooves, wherein the first arms were accommodated in the first grooves and the second arms were accommodated in the second grooves.

BRIEF DESCRIPTION OF THE DRAWINGS

FIG. 4A is a perspective view of parts of the digital card adapter formed in accordance with an embodiment of the invention.

FIG. 4B is a vertical view of the digital card adapter shown in FIG. 4A.

FIG. 5A is a lateral view of the digital card adapter shown in FIG. 4A.

FIG. 5B is a cross-section A-A of the digital card adapter shown in FIG. 5A.

DETAILED DESCRIPTION OF THE EMBODIMENT(S)

The present invention provides a digital card adapter in which a print circuit board being mounted inside a card-shape cover instead of previous art related to fabricating the same.

Figure 1:
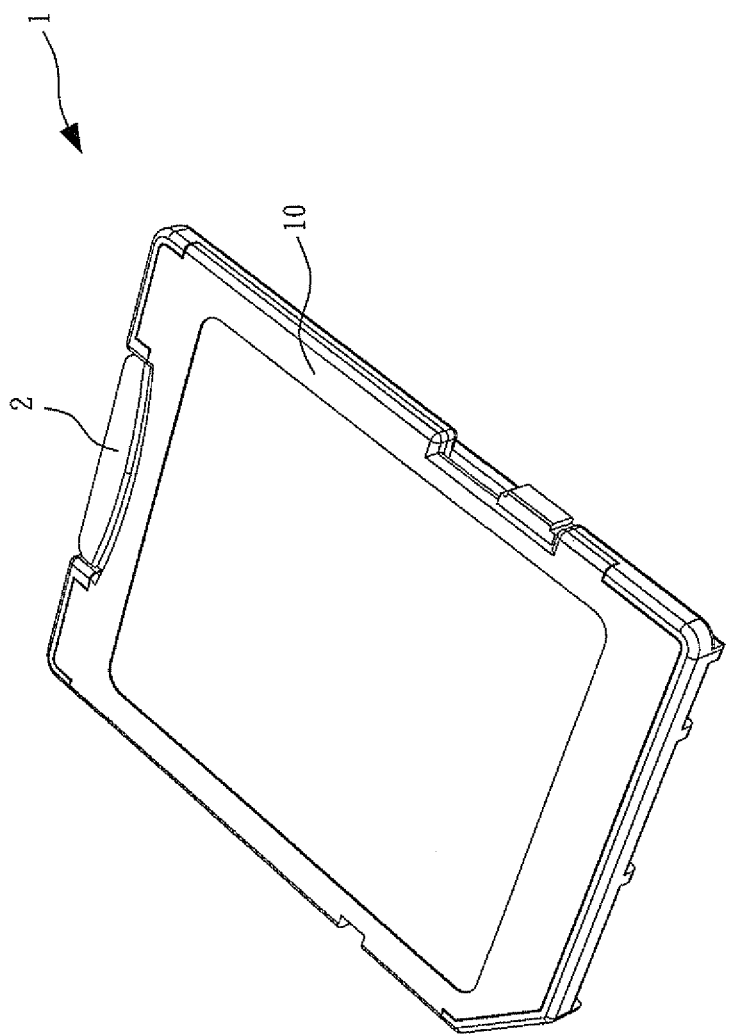
FIG. 1 is a perspective view of the digital card adapter formed in accordance with an embodiment of the invention.
Figure 2:
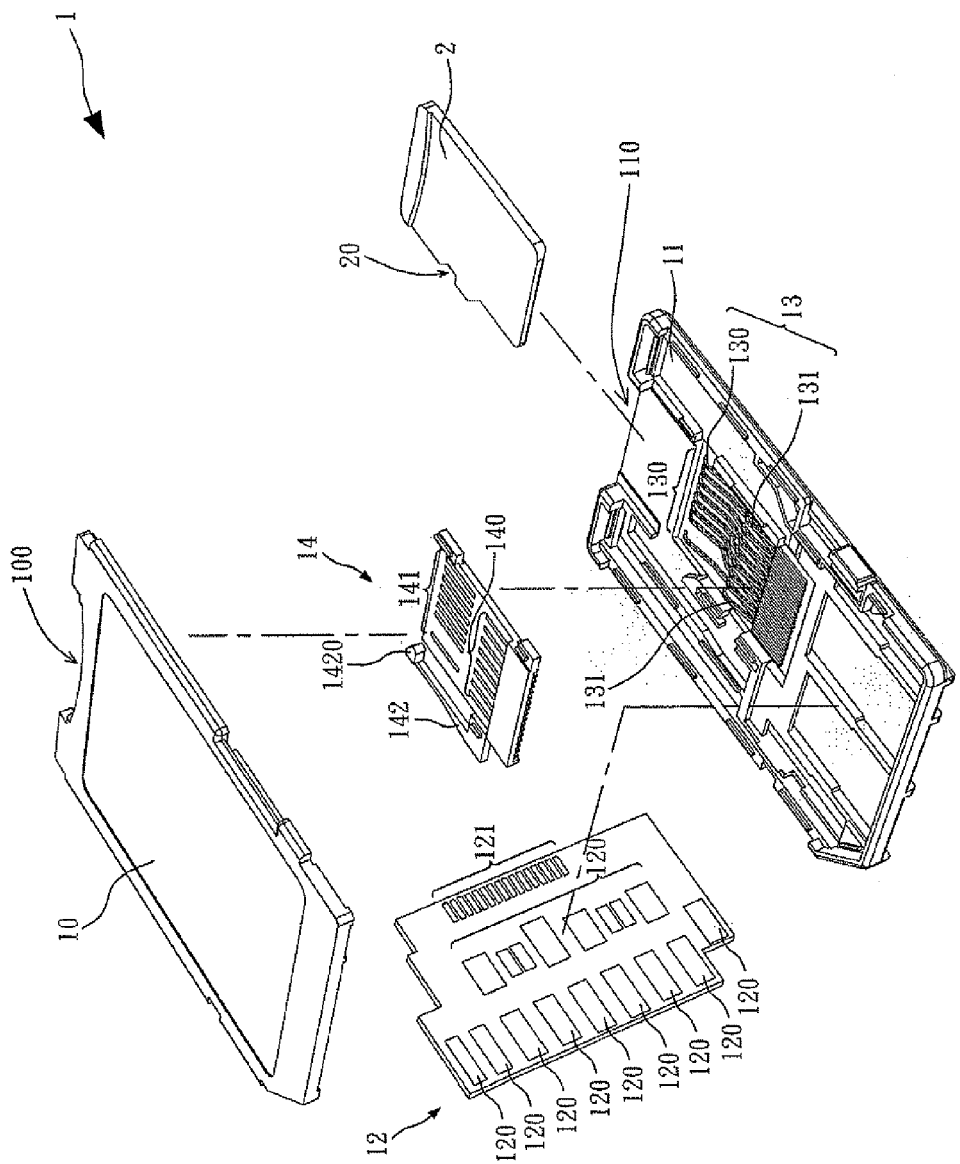
FIG. 2 is an exploded perspective view of the digital card adapter shown in FIG. 1.

As shown in FIGS. 1-2, the digital card adapter 1, comprises a top cover 10, a bottom cover 11 and an opening 100, and defines a slot 110 for receiving a digital card 2. The top cover 10 and bottom cover 11 were configured to a large-size appearance in shape of the SD card specification, wherein a small-size card 2 inserting there through the opening 100.

A printed circuit board 12 disposed at the front end of the bottom cover 11, includes: a plurality of contacts 120, a plurality of pads 121, a set of terminals 13 and an insulative housing 14. The contacts 120, which conformed to the SD card specifications, were configured to one end of the circuit board 12. The pads 121, which electrically connected to the contacts 120, were configured to another end of the circuit board 12.

The set of terminals 13 disposed in the center of the bottom cover 11 contains a plurality of first arms 130 and a plurality of second arms 131. The front ends of the first aims 130 and the second arms 131 were arranging in one line for each, and electrically connected to the pads 121 of the circuit board 12 in opposite direction. The insulative housing 14 includes a plurality of first grooves 140 and a plurality of second grooves 141, wherein the first arms 130 were accommodated in the first grooves 140 and the second arms 131 were accommodated in the second grooves 141.

In the preferred embodiment, an aperture 20 was configured in one side of the digital card 2, wherein a retention unit 142, locking the digital card 2 while inserted, was attached to the insulative housing 14. A protrude 1420 configured at a backward extended end of the resilient retention unit 142, retains the aperture 20 and firmly secures the position of the digital card 2.

The number of the contacts 120 is 17 upon of the printed circuit board 12. The number of the pads 121 is 16, wherein the number of the first arms 130 was 8, and the number of the second arms 131 was also 8. The top cover 10 was combined with the bottom cover 11 in the method of the ultrasonic welding or thermal-melting.

In this embodiment, the adapter 1 is designed to be a SD memory card, and the digital card 2 is designed to a microSD memory card. However, miscellaneous practices are not limited to such description. Further, the adapter 1 is designed to be a miniSD memory card, and the digital card 2 is designed to a microSD memory card. Or, the adapter 1 is designed to be a SD memory card, and the digital card 2 is designed to a miniSD memory card. The top cover 10, bottom cover 11 and insulative housing 14 were formed by single process for each.

Figure 3:
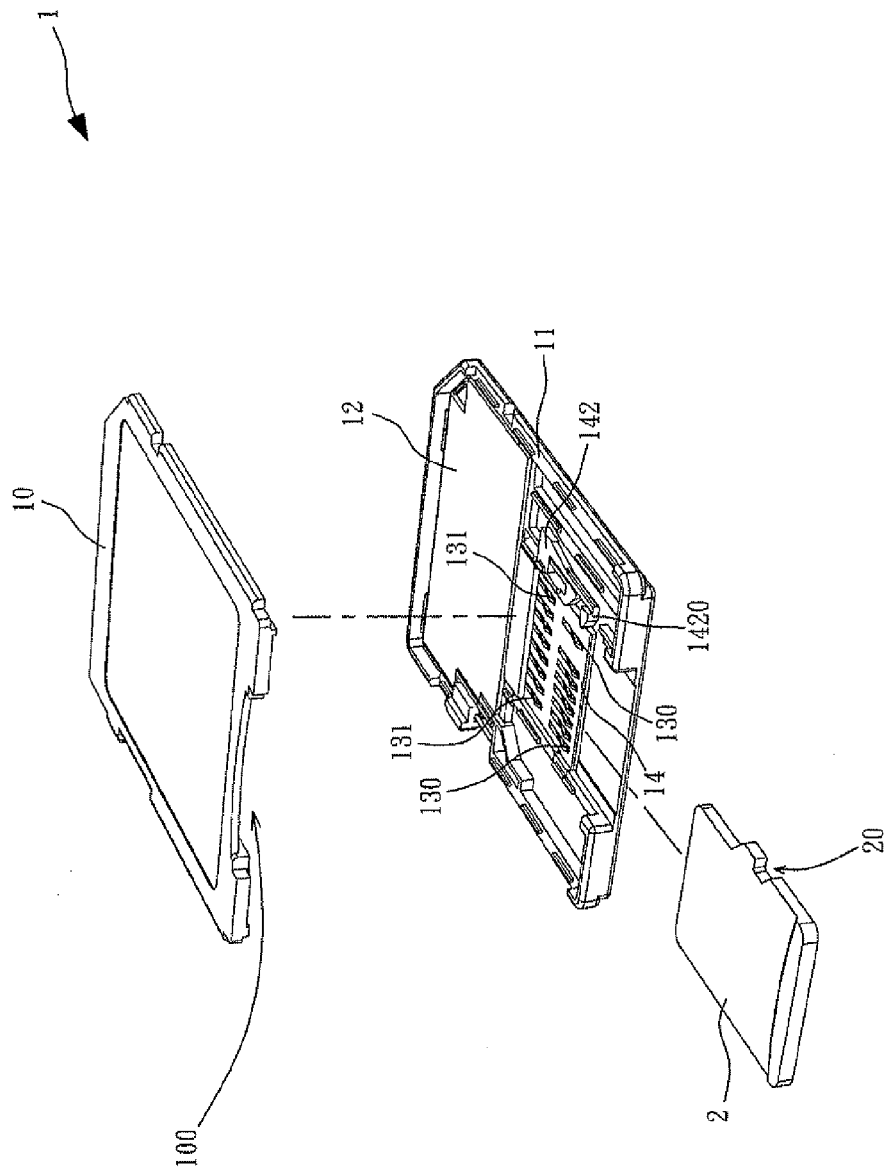
FIG. 3 is another exploded perspective view of the digital card adapter shown in FIG. 1.

As shown in FIGS. 2-3, the first arms 130 and the second arms 131, extended backwardly of one end, were corresponded with a plurality of contacts (not shown in the drawing) of a small-size digital card 2 conforming a standard of SD 4.0. Thus, the invention achieves adapting two SD 4.0 card provided in different sizes.

Figures 6A, 6B:
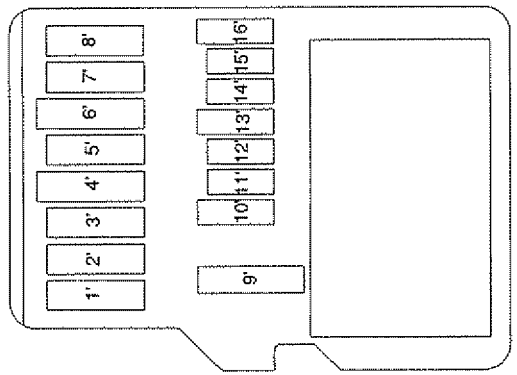
FIG. 6A is an upward view of a digital card public known and shown in FIG. 1.
FIG. 6B is a pin reference sheet of the digital card shown in FIG. 6A.

FIGS. 4-6 illustrated the details of connection between the circuit board 12 and the digital card 2. In FIGS. 4A-4B, the set of terminals is soldering to the circuit board 2 at coplanar, wherein a plurality of first soldering tails 132 opposite to the first arms 130 and a plurality of second soldering tails 133 opposite to the second arms 131 staggered and arranged in equal pitch. Each of second soldering tails 133 were lined next to one first soldering tails 132, whereof the second soldering tails 133 contain bent portions 134 which extended to the front end of second arms 131.

The first soldering tails 132 comprise two pair terminals designed to transfer differential signals, which were number 11', 12' and 14', 15'. According to the arrangement of the set of terminals 13 above, each differential pair having +, − signal terminal has been separated by non-signal terminal which were number 4' and 7' (shown in FIG. 5B). High frequency tuning function thereto is affected in transmission across improved terminals 13 between the digital card 2 and circuit board 12.

In addition, the present invention, a digital card adapter 1, by the first grooves 140 and the second grooves 141 of the insulative housing 14, secures the end of first arms 130 and second arms 131 to be fixed in a position opposite to contacts of the digital card 2, therefore, avoiding the arms 130, 131 unnecessary upward or downward, and avoiding unwanted damages of the digital card 2 as well.

The last, the present invention, by the retention unit 142 of the insulative housing 14, secures the digital card 2 to be fixed in adapter 1. Besides, simply push digital card 2 forward, when the users try to remove the card 2, and then easily take the digital card 2 from released status.

According to the above embodiment, the present invention provides a digital card adapter in which a print circuit board being mounted inside a card-shape cover, and accomplishes to transfer data there between two different sizes cards in accordance with standard of SD 4.0 specification.

While the invention has been described in terms of various specific embodiments, those skilled in the art will recognize that the invention can be practiced with modification within the spirit and scope of the claims.

What is claimed is:

1. A digital card adapter, comprising:
   a cover assembly having a top cover, a bottom cover and an opening, and defining a slot for receiving a digital card through said opening; and
   an insulative housing; and
   a printed circuit board disposed at the front end of said bottom cover, having a plurality of contacts configured to one end of said circuit board, and a plurality of pads, electrically connected to said contacts, configured to another end of said circuit board; and
   a set of terminals disposed in the center of said bottom cover having a plurality of first arms and a plurality of second arms, wherein the front ends of the first arms and the second arms electrically connected to the pads of the circuit board;
   wherein a plurality of first soldering tails opposite to the first arms and a plurality of second soldering tails opposite to the second arms were staggered and arranged in equal pitch.

2. The digital card adapter of claim 1, wherein said top cover and said bottom cover were configured to a large-size appearance in shape of the SD card specification.

3. The digital card adapter of claim 1, wherein said contacts were conformed to the SD card specifications.

4. The digital card adapter of claim 1, wherein the front ends of said first arms and said second arms were arranging in one line for each, and electrically connected to said pads in opposite direction.

5. The digital card adapter of claim 1, wherein said insulative housing having a plurality of first grooves and a plurality of second grooves, wherein said first arms were accommodated in said first grooves and said second arms were accommodated in said second grooves.

6. The digital card adapter of claim 1, wherein said set of terminals being soldering to said circuit board at coplanar.

7. The digital card adapter of claim 1, wherein said the first arms and the second arms extended backwardly of one end, and were corresponded with a plurality of contacts, of a small-size digital card conforming a standard of SD 4.0.

8. The digital card adapter of claim 1, wherein the plurality of contacts consists of seventeen (17) contacts, and the plurality of pads consists of sixteen (16) pads.

9. The digital card adapter of claim 1, wherein an aperture was configured in one side of said digital card, and a retention unit, locking said digital card, was attached to said insulative housing, wherein a protrude configured at a backward extended end of said retention unit.

10. The digital card adapter of claim 1, wherein each of said second soldering tails were lined next to one first soldering tails, whereof said second soldering tails contained bent portions which extended to the front end of said second arms.

11. The digital card adapter of claim 1, wherein said first soldering tails comprising two pair terminals designed to transfer differential signals, whereof each differential pair was separated by one non-signal terminal.

* * * * *